US007032224B2

(12) United States Patent
Kadakia et al.

(10) Patent No.: US 7,032,224 B2
(45) Date of Patent: Apr. 18, 2006

(54) METHOD FOR THE SECURE AND TIMELY DELIVERY OF LARGE MESSAGES OVER A DISTRIBUTED COMMUNICATION NETWORK

(75) Inventors: Viral Kadakia, Sunnyvale, CA (US); Ramakrishna Chinta, Sunnyvale, CA (US); Randy Menna, San Jose, CA (US)

(73) Assignee: Slam Dunk Networks, Inc., San Mateo, CA (US)

( * ) Notice: Subject to any disclaimer, the term of this patent is extended or adjusted under 35 U.S.C. 154(b) by 609 days.

(21) Appl. No.: 10/039,766

(22) Filed: Dec. 31, 2001

(65) Prior Publication Data

US 2003/0126303 A1   Jul. 3, 2003

(51) Int. Cl.
G06F 9/44 (2006.01)
(52) U.S. Cl. ................. 719/313; 713/170; 713/176; 709/239
(58) Field of Classification Search ............... 719/313; 709/206, 239; 713/176, 201, 170; 370/473; 375/295; 455/403
See application file for complete search history.

(56) References Cited

U.S. PATENT DOCUMENTS

| | | | | | |
|---|---|---|---|---|---|
| 5,870,563 | A | * | 2/1999 | Roper et al. ................. | 709/239 |
| 6,044,395 | A | * | 3/2000 | Costales et al. ............. | 709/206 |
| 6,108,530 | A | * | 8/2000 | Ayabe et al. ................. | 455/403 |
| 6,721,335 | B1 | * | 4/2004 | Gregg ........................ | 370/473 |
| 6,817,018 | B1 | * | 11/2004 | Clarke et al. ................ | 719/313 |
| 6,839,842 | B1 | * | 1/2005 | Iverson et al. .............. | 713/176 |
| 2002/0080888 | A1 | * | 6/2002 | Shu et al. ................... | 375/295 |
| 2002/0083345 | A1 | * | 6/2002 | Halliday et al. ............ | 713/201 |

FOREIGN PATENT DOCUMENTS

WO    WO 00/18078    *    3/2000

OTHER PUBLICATIONS

Kamal "efficient multi-segment message transmission with slot reuse on DQDB" 1991 IEEE, pp. 0869-0878.*
Pande et al. "A message segmentation technique to minimize task completion time" 1991 IEEE, pp. 519-524.*

* cited by examiner

*Primary Examiner*—William Thomson
*Assistant Examiner*—Van Nguyen
(74) *Attorney, Agent, or Firm*—McDermott Will & Emery LLP

(57) ABSTRACT

A method for transferring messages across a communication network is disclosed. A message being received at a message source from a sending application program is segmented into message segments. While this segmentation is occurring, a common message identifier and a unique sequence number are assigned to each message segment. The message segments are transferred from the message source to a message destination, with at least one of the message segments being transferred as the message is being received at the message source. Prior to the entire message being received at the message source and segmented, message segments that have already been segmented from the message are transferred to the message destination. At the message destination, the message segments are received and assembled into a reassembled message A portion of the reassembled message is delivered to a receiving application while the assembling is occurring.

13 Claims, 3 Drawing Sheets

METHOD FOR THE SECURE AND TIMELY DELIVERY OF LARGE MESSAGES OVER A DISTRIBUTED COMMUNICATION NETWORK

BACKGROUND OF THE INVENTION

1. Field of the Invention

The present invention relates, in general, to methods for transferring messages over a distributed communication network and, in particular, to methods for the secure and timely delivery of large messages over a distributed communication network.

2. Description of the Related Art

The successful transfer of large time-sensitive messages between application programs requires a reliable, secure and timely transfer method and infrastructure. Conventional approaches to providing a reliable message transfer method and infrastructure include dedicated T1 lines, Virtual Area Networks (VANs) and Virtual Private Networks (VPNs). These approaches, however, are slow, cumbersome and/or expensive.

TCP-IP protocol was developed to reliably transfer messages between application programs. However, recovery from message delivery failures is complicated in the TCP-IP protocol due to the need to contact the application program, from which the message originated, in order to recover and resend the entire message.

Furthermore, the secure and timely transfer of relatively large messages (e.g., messages greater than 1 gigabyte in size) using conventional methods and infrastructure presents at least two significant difficulties that are unnoticed or disregarded when transferring relatively small messages. First, if such relatively large messages are placed in a buffer (i.e., "buffered") before being encrypted for secure transfer, the transfer is delayed (in other words, latency is increased) and resource requirements for both the sending and receiving hardware and software are increased. Second, if such relatively large messages are "streamed" between a sending application program and a receiving application program (i.e., the individual message bytes are transferred as soon as they become available from the sending application program), the ability to recover from message transfer errors is significantly degraded.

Methods providing for the reliable transfer of messages on a distributed communication network (e.g., the Internet) that involve simultaneous transfer of multiple copies of a message along alternate message paths have been described (see U.S. patent application Ser. No. 09/740,521, filed Dec. 18, 2000, entitled "System and for Handling Information and Information Transfers in a Computer Network" and U.S. patent and application Ser. No. 09/997,839, filed Nov. 29, 2001, entitled "Method for Transferring Messages Along Optimally Redundant Communication Paths in a Distributed Communication Network", both of which are hereby fully incorporated by reference for all purposes. However, these methods do not address the issue of securely and reliably transferring a large message in a very timely manner (i.e., securely and reliably transferring a large message with low latency and without the need for the entire message to be resent in case of transient delivery failures).

Still needed in the field, therefore, is a timely method for transferring large messages across a distributed communication network. The method should also provide for the secure and reliable transfer of large messages across a distributed communication network.

SUMMARY OF THE INVENTION

An embodiment of a method according to the present invention provides for transferring messages between a sending application program and a receiving application program across a distributed communication network (e.g., the Internet). The distributed communication network, across which the message is delivered, includes a message source coupled to a message destination. The method includes segmenting a message (e.g., a relatively large message greater than 1 gigabyte in size) being received at the message source from the sending application program into a plurality of message segments. While this segmentation is occurring, a common message identifier and a unique sequence number are assigned to each of the plurality of message segments.

The method also includes transferring the plurality of message segments from the message source to the message destination along with the common message identifier and unique sequence numbers assigned to the plurality of message segments with at least one of the plurality of message segments being transferred as the message is being received at the message source. For example, each message segment can be transferred as soon as each segment has been segmented from the message and is otherwise ready to be transferred, thus providing "quantitized streaming" of messages from the message source to the message destination. In other words, prior to the entire message being received at the message source and segmented, message segments that have already been segmented from the message are transferred (i.e., sent) to the message destination.

The method further includes assembling, at the message destination, the plurality of message segments that have been transferred from the message source into a reassembled message. This assembling occurs as the plurality of message segments are being received at the message destination. In addition, at least a portion of the reassembled message is delivered (i.e., sent) to the receiving application program while the assembling of the entire message is occurring. That is, delivery to the receiving application program of a message that is being reassembled can begin even while remaining message segments are in transit or being assembled.

Since message segments are transferred to the message destination while the message is being received, the entire message need not be buffered at the message source. Also, since delivery of the reassembled message to the receiving application program can begin as soon as the first message segment is received, the entire reassembled message need not be buffered at the message destination. As buffering of the entire message is not required at the message source and the message destination, the message is delivered with low latency (i.e., in a timely manner with minimal delay) and memory storage requirements (e.g., buffers and/or cache memory) at the message source and message destination are minimized. In addition, the use of a distributed communication network, such as broadband Internet, provides a method according to the present invention with a non-cumbersome and inexpensive communication medium.

In an alternative embodiment, each of the plurality of message segments is encrypted and digitally signed prior to being transferred from the message source to the message destination. At the message destination, the authenticity and integrity of each of the plurality of message segments is verified prior to assembly of the message segment into the re-assembled message. The encryption and signing of each of the plurality of message segments at the message source and the verification of authenticity and integrity of those message segments at the message destination ensure the security of the message as it is transferred across the distributed communication network.

In the event that a portion of the reassembled message fails to be delivered to the message destination, methods according to the present invention can recover and redeliver the reassembled message without contacting the application program from which the message originated. This aspect of the invention further reduces latency.

A better understanding of the features and advantages of the present invention will be obtained by reference to the following detailed description that sets forth illustrative embodiments, in which the principles of the invention are utilized, and the accompanying drawings.

DESCRIPTION OF EXEMPLARY EMBODIMENTS OF THE INVENTION

Figure 1:
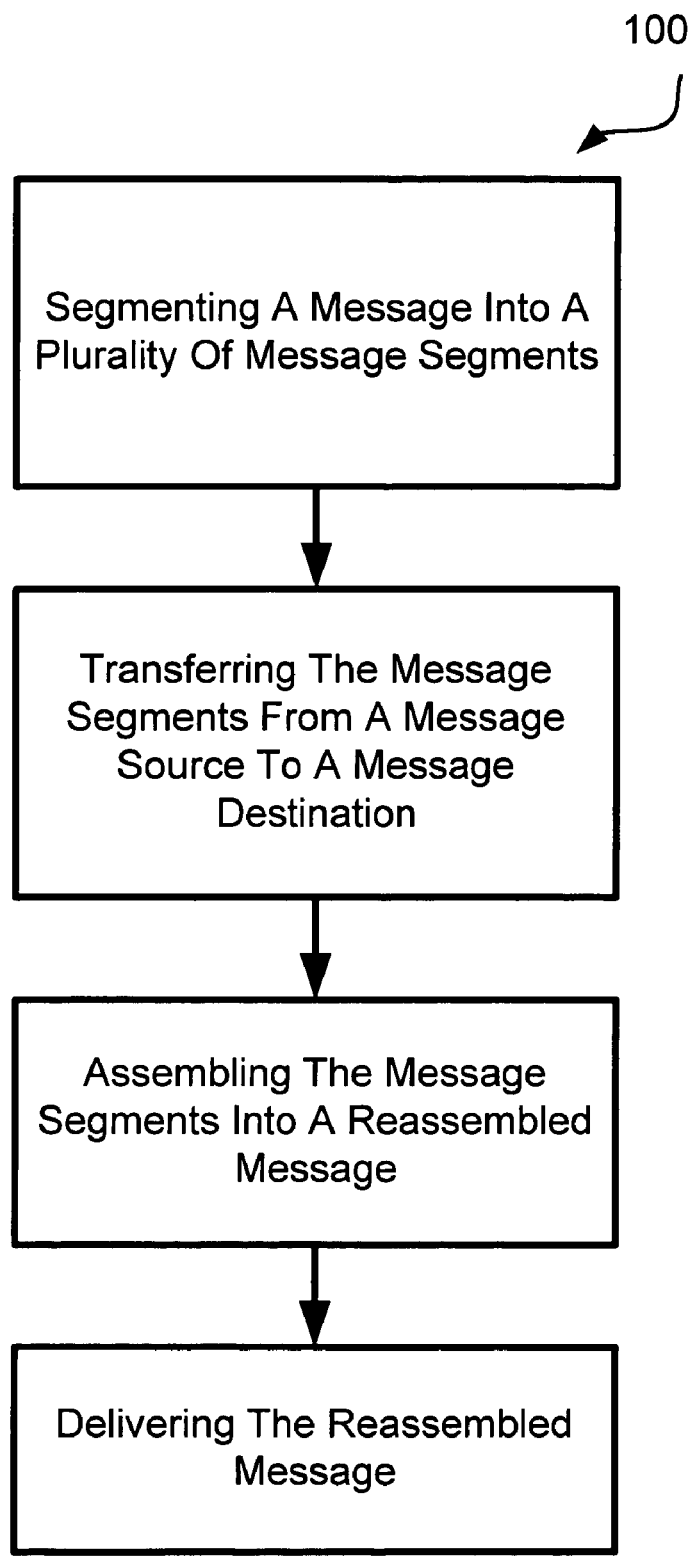
FIG. 1 is a flow diagram illustrating a sequence of steps in a process according to one exemplary embodiment of the present invention.

FIG. 1 is a flow diagram illustrating a sequence of steps in a process 100 for transferring messages between a sending application program and a receiving application program across a distributed communication network (e.g., the Internet) according to one exemplary embodiment of the present invention. The distributed communication network, over which the message is transferred, includes a message source coupled to a message destination. The sending and receiving application programs can be any suitable application programs known to one skilled in the art including, but not limited to, business-to-business (B2B) application programs.

Figure 2:
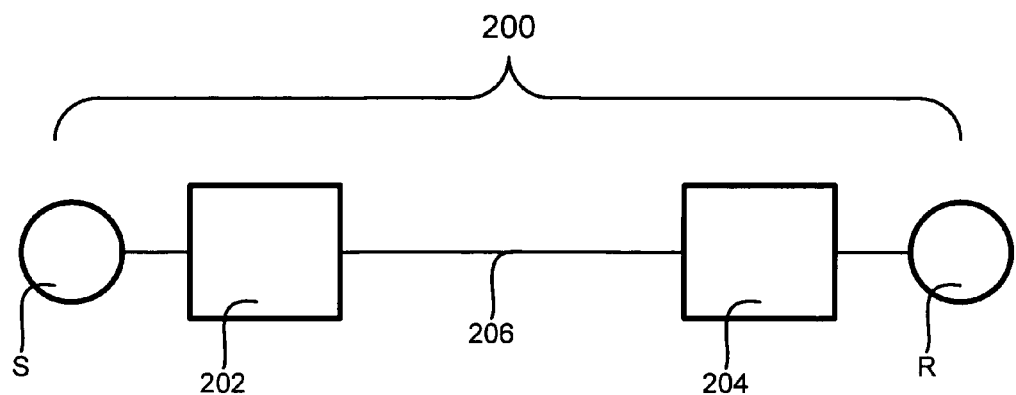
FIG. 2 is a simplified diagram illustrating a portion of a distributed communication network, in which a method in accordance with one exemplary embodiment of the present invention operates.

FIG. 2 is diagram of a portion of exemplary distributed communication network 200, over which process 100 operates to transfer a message. Distributed communication network 200 includes a message source 202 and a message destination 204, which are linked by at least one message path 206. In addition, message source 202 and message destination 204 are linked to a sending application program (S) and a receiving application program (R), respectively.

Message source 202 and message destination 204 can be any suitable message source and destination known to one skilled in the art including, but not limited to, a connector message source and a connector message destination through which application programs (e.g., business-to-business [B2B] Electronic Document Interchange [EDI] application programs) gain access to message path 206. The connectors can be, for example, software components that populate an application program server. Such connectors are described in detail in the aforementioned U.S. patent application Ser. No. 09/740,521, filed Dec. 18, 2000, and entitled "System for Handling Information and Information Transfers in a Computer Network."

Referring again to FIG. 1, process 100 includes segmenting a message being received at message source 202 from sending application program S into a plurality of message segments, as set forth in step 110. These message segments can be thought of as "chunks" of the entire message. The size of the message segments (i.e., "chunks") can be optimized based on configuration and architecture of the distributed communication network. A typical size for each of the plurality of message segments is, for example, 0.5 MegaBytes.

During this segmenting step, each message segment is assigned two message attributes, namely a common message identifier and a unique sequence number. The common message identifier uniquely identifies the message from which a given message segment was formed. Therefore, all of the plurality of message segments formed (i.e., segmented) from a given message will be assigned an identical common message identifier. The unique sequence number assigned to each message segment is unique to each particular message segment and defines location of that message segment in relationship to the other message segments of the message. For example, the unique message sequence number "3" can be used to identify the third message segment of a message.

If desired, each of the plurality of message segments can be assigned additional message segment attributes, including (i) a message segment identification attribute; (ii) a message length attribute specifying the total number of bytes segmented from the message thus far (i.e., a running message length attribute); (iii) a last segment attribute specifying whether the message segment is the last message segment from a message; (iv) a previous message segment ID attribute; (v) a message attribute specifying whether an error has been encountered during the segmenting process step; and (vi) conventional message attributes known to those skilled in the art.

Figure 3:
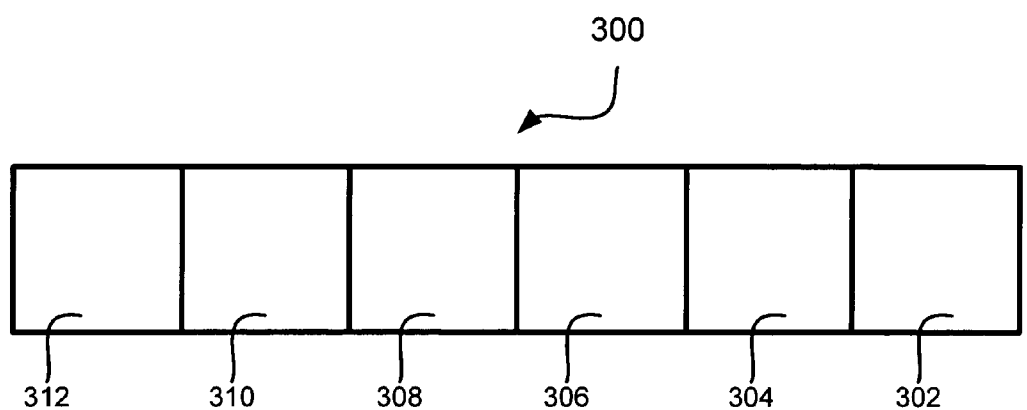
FIG. 3 is a simplified representation of the manner, in which a large message can be segmented into a plurality of message segments by a method according to one exemplary embodiment of the present invention.

FIG. 3 is a simplified representation of the manner in which a large message can be segmented into a plurality of message segments by a method according to one exemplary embodiment of the present invention. In FIG. 3, large message 300 is shown segmented into six message segments 302, 304, 306, 308, 310 and 312. In methods according to the present invention, each of message segments 302, 304, 306, 308, 310 and 312 would be assigned a common message identifier (e.g., the message ID of message 300) that identifies the message segments as belonging to message 300. In addition, each of the message segments would be assigned a unique sequence number, for example, unique sequence numbers from 1 to 6.

Referring again to FIG. 1, the plurality of message segments are transferred from the message source to the message destination along with the common message identifier and unique sequence number assigned thereto, as set forth in step 120. In addition, the plurality of message segments are transferred as they become ready to be transferred while the message is being received at the message source. If desired to increase the reliability of message transfer, the transferring of the plurality of message segments can include simultaneously transferring multiple copies of the plurality of message segments, along with the assigned common message identifier and unique sequence number over alternate paths of the distributed communication network.

As set forth in step 130 of FIG. 1, as the plurality of message segments are received at the message destination, the plurality of message segments are assembled into a reassembled message. This assembling can occur, for example, in a cache of the message destination. The reassembled message is then delivered to the receiving application program, as soon as the message segments are received and assembled, even while the assembly of other received message segments is occurring, as set forth in step 140. For example, once the message destination has received the first message segment (or first and second message segments) that was segmented from a message, that first message segment (or first and second message segment) can be "streamed" (i.e., delivered) to the receiving application as a standard streaming message. In other words, the delivery of re-assembled message to a receiving application (e.g., by a streaming technique) can be initiated while additional message segments which will become part of the re-assembled message are still being received and reassembled at the message destination.

Figure 4:
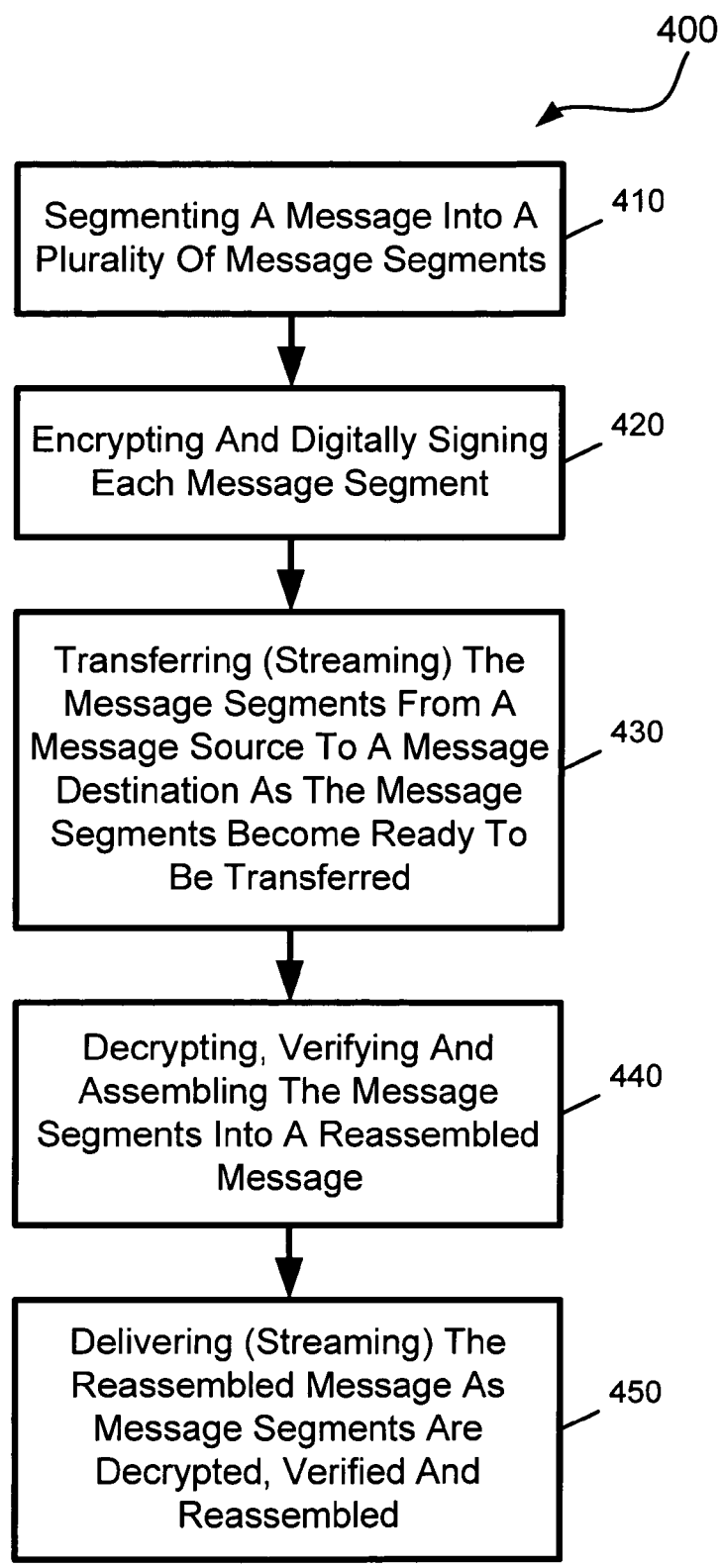
FIG. 4 is a flow diagram illustrating a sequence of steps in a process according to another exemplary embodiment of the invention.

FIG. 4 is a flow diagram illustrating a sequence of steps in a process 400 for transferring messages between a sending application program and a receiving application program across a distributed communication network (e.g., the Internet) according to another exemplary embodiment of the present invention. The distributed communication network, over which the message is transferred, includes a message source coupled to a message destination.

Process 400 includes segmenting a message being received at the message source from a sending application program into a plurality of message segments, as set forth in step 410. In process 400, each of the plurality of message segments is encrypted and digitally signed (e.g., with a Public Key Infrastructure private key) prior to being transferred from the message source to the message destination (see step 420 of FIG. 4). This encryption and digital signature provides security for both the complete message and individual message segments.

The plurality of encrypted and digitally signed message segments are then transferred (e.g., streamed) from the message source to the message destination along with the common message identifier and unique sequence number assigned thereto. Each of the plurality of message segments is transferred as it becomes ready to be transferred while the remainder of the message is being received at the message source, as set forth in step 430.

As the plurality of message segments are received at the message destination, the authenticity and integrity of each of the plurality of message segments is verified prior to assembly of each message segment into the reassembled message (see step 440). This is accomplished by decrypting the message segment and verifying that the signature and hence the message segment is authentic. The encryption and signing of each of the plurality of message segments at the message source and the verification of authenticity and integrity of those message segments at the message destination ensure the security of the message as it is transferred across the distributed communication network.

The reassembled message is then delivered in a streaming manner to the receiving application program, as soon as each of the message segments is received, decrypted, verified and assembled, even while the assembly of other received message segments is occurring, as set forth in step 450. In other words, the delivery of re-assembled message to a receiving application program (e.g., by a streaming technique) can be initiated while additional message segments that will become part of the re-assembled message are still being received, decrypted, verified and reassembled at the message destination.

Procedures for segmenting, signing, transferring, validating, assembling and delivering can be efficiently implemented via software and hardware (e.g., a cache for storing individual bytes of a message during segmentation) at the message source and message destination by one of ordinary skill in the art once apprised of the present disclosure. Once apprised of the present disclosure, one of ordinary skill in the art will also recognize that the present method can be utilized in a variety of distributed communication networks to improve the reliability, security and timeliness of large message transfer. Such distributed networks include, but are not limited to, those described in the aforementioned U.S. patent application (i.e., application Ser. No. 09/740,521, filed Dec. 18, 2000, entitled "System for Handling Information and Information Transfers in a Computer Network").

It should be understood that various alternatives to the embodiments of the invention described herein may be employed in practicing the invention. It is intended that the following claims define the scope of the invention and that methods within the scope of these claims and their equivalents be covered thereby.

What is claimed is:

1. A computer-implemented method for transferring messages between a sending application program and a receiving application program across a distributed communication network, wherein the distributed communication network includes a message source coupled to a message destination, the method comprising:

segmenting a message being received at the message source from the sending application program into a plurality of message segments while encrypting, digitally signing and assigning a common message identifier and a unique sequence number to each of the message segments, the message having a plurality of data portions;

transferring the message segments from the message source to the message destination along with the common message identifier and unique sequence numbers assigned to the message segments, wherein at least one of the message segments having at least one data portion is being transferred as other data portions of the message are concurrently being received at the message source;

verifying the authenticity of each of the message segments while assembling the message segments into one or more portions of a reassembled message as the message segments are received at the message destination; and delivering the one or more portions of the reassembled message to the receiving application program once the one or more portions of the reassembled message are ready to be delivered and while the assembling of other portions of the reassembled message is occurring;

wherein during the transferring step, simultaneously transferring multiple copies of each message segment along with the assigned common message identifier and unique sequence number over alternate paths of the distributed communication network.

2. The method of claim 1, further comprising during the segmenting step, segmenting a message into the message segments wherein each message segment is no more than 0.5 mega-bytes in size.

3. The method of claim 1, further comprising during the transferring step, transferring a message from a connector message source.

4. The method of claim 1, further comprising during the segmenting step, segmenting a message that is greater than 1 giga-byte in size.

5. The method of claim 1, further comprising during the segmenting step, assigning a last segment attribute specifying whether the message segment is the last message segment from a message to each of the message segments.

6. The method of claim 1, wherein the transferring step includes streaming message segments to the message destination as each of the plurality of message segments becomes ready to be transferred.

7. The method of claim 1, wherein the delivering step includes streaming the one or more portions of the reassembled message to the receiving application program while message segments are being assembled concurrently into other portions of the reassembled message.

8. The method of claim 1, further comprising during the segmenting step, assigning a message length attribute to each of the message segments, the message length attribute specifying the most recent total number of bytes segmented from the message.

9. The method of claim 1, further comprising during the segmenting step, assigning a message error attribute to each of the message segments, the message error attribute specifying whether an error has been encountered during the segmenting step.

10. A computer-implemented method for transferring messages between a sending application program and a receiving application program across a distributed communication network, wherein the distributed communication network includes a message source coupled to a message destination, the method comprising:

segmenting a message being received at the message source from the sending application program into a plurality of message segments while encrypting, digitally signing and assigning a common message identifier and a unique sequence number to each of the message segments, the message having a plurality of data portions;

transferring the encrypted and digitally signed message segments from the message source to the message destination along with the common message identifier and unique sequence numbers assigned to the message segments, wherein at least one of the encrypted and digitally signed message segments having at least one data portion is being transferred as other data portions of the message are concurrently being received at the message source;

verifying the authenticity of each of the message segments while assembling the message segments into one or more portions of a reassembled message as the message segments are received at the message destination; and delivering the one or more portions of the reassembled message to the receiving application program once the one or more portions of the reassembled message are ready to be delivered and while the assembling of other portions of the reassembled message is occurring;

wherein during the transferring step, simultaneously transferring multiple copies of each encrypted and digitally signed message segment along with the assigned common message identifier and unique sequence number over alternate paths of the distributed communication network.

11. The method of claim 10, further comprising during the segmenting step, assigning a last segment attribute specifying whether the message segment is the last message segment from a message to each of the message segments.

12. The method of claim 10, further comprising during the segmenting step, assigning a message length attribute to each of the message segments, the message length attribute specifying the most recent total number of bytes segmented from the message.

13. The method of claim 10, further comprising during the segmenting step, assigning a message error attribute to each of the message segments, the message error attribute specifying whether an error has been encountered during the segmenting step.

* * * * *